(12) United States Patent
Drepper

(10) Patent No.: US 11,941,382 B2
(45) Date of Patent: Mar. 26, 2024

(54) USER CUSTOMIZABLE COMPILER ATTRIBUTES FOR CODE CHECKING

(71) Applicant: Red Hat, Inc., Raleigh, NC (US)

(72) Inventor: Ulrich Drepper, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 5 days.

(21) Appl. No.: 17/665,832

(22) Filed: Feb. 7, 2022

(65) Prior Publication Data

US 2023/0251837 A1   Aug. 10, 2023

(51) Int. Cl.
*G06F 8/41* (2018.01)

(52) U.S. Cl.
CPC .................................. *G06F 8/437* (2013.01)

(58) Field of Classification Search
CPC .......................................................... G06F 8/41
See application file for complete search history.

(56) References Cited

U.S. PATENT DOCUMENTS

| | | | | |
|---|---|---|---|---|
| 5,978,583 | A * | 11/1999 | Ekanadham | G06F 9/5077 717/106 |
| 7,150,010 | B1 * | 12/2006 | Ringseth | G06F 8/315 717/140 |
| 8,219,378 | B1 * | 7/2012 | Koh | G06F 30/20 703/20 |
| 9,274,771 | B1 | 3/2016 | Kalogeropulos et al. | |
| 2002/0010866 | A1 * | 1/2002 | McCullough | H04L 63/164 709/228 |
| 2003/0233641 | A1 | 12/2003 | Hank | |
| 2004/0261066 | A1 * | 12/2004 | Ringseth | G06F 8/43 717/141 |
| 2005/0193369 | A1 * | 9/2005 | Brumme | G06F 8/52 717/136 |
| 2006/0206866 | A1 * | 9/2006 | Eldrige | G05B 15/02 717/122 |
| 2006/0265485 | A1 * | 11/2006 | Chai | G06F 9/3455 709/223 |
| 2007/0124334 | A1 * | 5/2007 | Pepin | G06F 8/73 |
| 2010/0125838 | A1 | 5/2010 | Kuusilinna et al. | |

(Continued)

FOREIGN PATENT DOCUMENTS

CN      113238740      8/2021

OTHER PUBLICATIONS

"Program Defined Attributes", 2019, wiki.visual-prolog.com, 2 pages.

*Primary Examiner* — Jae U Jeon
(74) *Attorney, Agent, or Firm* — Dority & Manning, P.A.

(57) ABSTRACT

Disclosed herein is technology to use customized compiler attributes to check source code. An example method may include: accessing, by a processing device executing a compiler, a source code that comprises a compiler attribute associated with a programming construct, wherein the compiler attribute is defined in the source code; executing, by the processing device, a function of the compiler to check the programming construct at a location in the source code, wherein the function checks the programming construct by evaluating the compiler attribute associated with the programming construct; determining, by the processing device executing the compiler, whether to generate a message indicating a status of the check; and generating, by the processing device executing the compiler, object code based on the source code that comprises the compiler attribute.

20 Claims, 8 Drawing Sheets

(56) References Cited

U.S. PATENT DOCUMENTS

| | | | |
|---|---|---|---|
| 2012/0030652 A1* | 2/2012 | Jelinek | G06F 8/41 717/124 |
| 2014/0101642 A1* | 4/2014 | Morrison | G06F 8/44 717/140 |
| 2014/0157232 A1* | 6/2014 | Li | G06F 8/48 717/110 |
| 2016/0085528 A1 | 3/2016 | Kalogeropulos et al. | |
| 2017/0039143 A1* | 2/2017 | Ritchie | G06F 16/9014 |
| 2019/0272160 A1 | 9/2019 | Leopoldseder et al. | |
| 2020/0379739 A1 | 12/2020 | Bhownani et al. | |
| 2021/0173640 A1 | 6/2021 | Irvin et al. | |

\* cited by examiner

USER CUSTOMIZABLE COMPILER ATTRIBUTES FOR CODE CHECKING

TECHNICAL FIELD

The present disclosure is generally related to source code compilers, and is more specifically related to compiler attributes that can be defined in source code by a computer programmer and used to enhance the functionality of the compiler.

BACKGROUND

Computer programming often involves a user writing source code that is translated into an executable computer program. Translating the source code into the executable program is typically performed using one or more compilers. A compiler can be any computer program that translates code written in one programming language (e.g., source code) into code of another language (e.g., machine code).

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
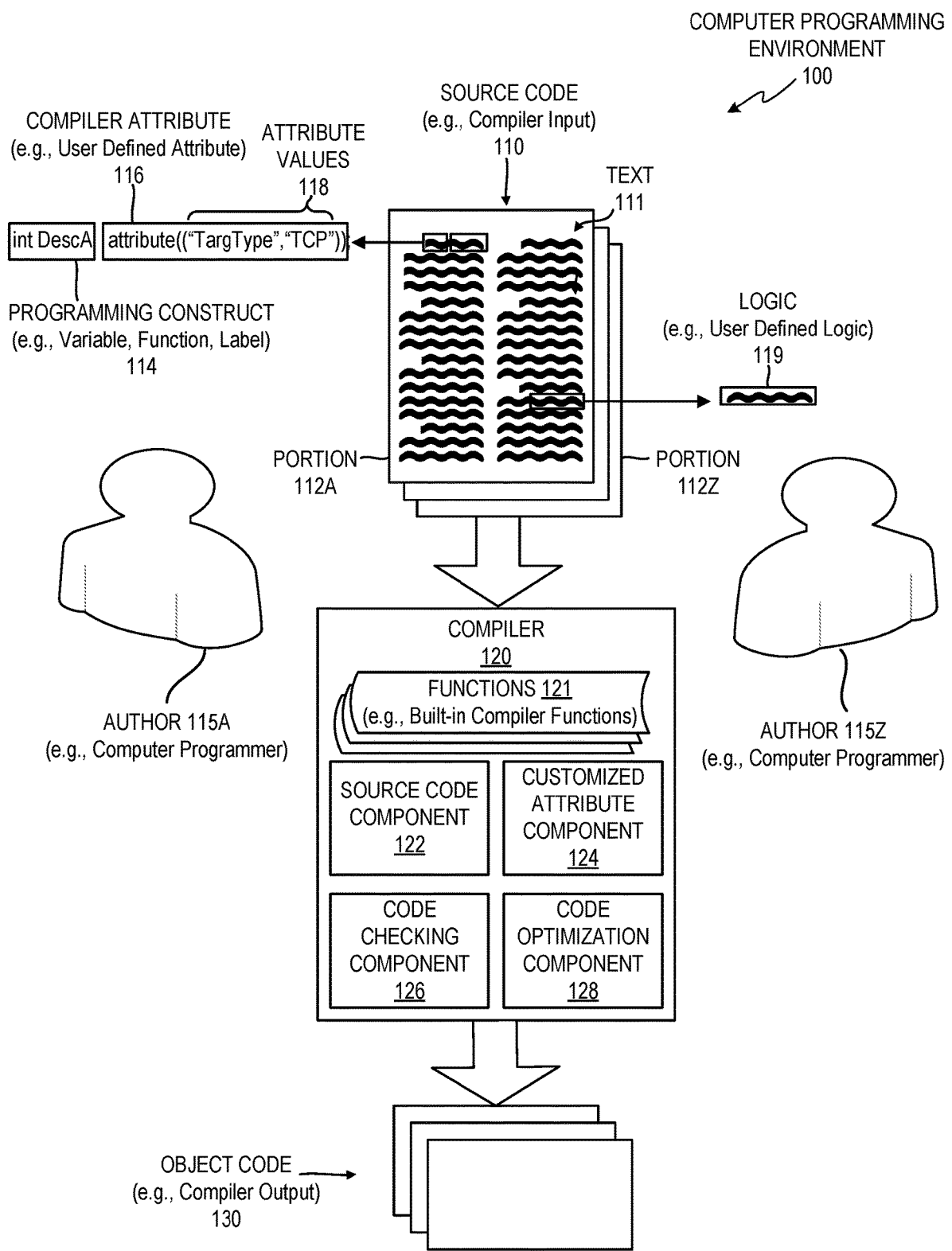
FIG. 1 depicts a high-level block diagram of an example computer programming environment, in accordance with one or more aspects of the present disclosure.

Compilers analyze source code and compile the source code to generate output code. The output code can be in the form of object code and may be executable code (e.g., machine code), intermediate code (e.g., bytecode), other code, or a combination thereof. The source code can be written by an author (e.g., computer programmer) and the information provided by the author is often limited to the syntax of the programming language. The compiler evaluates the source code according to the syntax and semantic of the programming language specification and uses internal data structures to represent and propagate information about the source code. The information is used to check the source code and to optimize the output of the compiler.

The authors of the source code often possess information about a computer program that is valuable to a compiler but may be inaccessible to the compiler. The information may correspond to one or more programming constructs in the source code that is being compiled. The information may be related to a target of the programming construct, a source of the programming construct, other information, or a combination thereof. The information may be inaccessible to the compiler because the programming language may not support conveying the information in the source code using the rules of the programming language or incorporating the information into the source code may change the output code (e.g., change the Application Programming Interface (API) or Application Binary Interface (ABI)). Enabling the compiler to access and evaluate the additionally provided information of the author may be useful for code checking, compiler optimizations, other reason, or a combination thereof.

Aspects of the present disclosure address the above and other deficiencies by providing compiler technology that enables an author of the source code to provide additional information to the compiler in the form of customized compiler attributes and customized logic for processing the compiler attributes. The customizations can be defined in the source code of a computer program by adding text into an existing body of source code or adding it into the source code as it is generated. The customizations added to the source code may or may not change the compiled version of the source code. The compiler attributes can include one or more programmer provided values (e.g., strings, integers, boolean). In one example, the customized compiler attribute may be added to source code to indicate information about a target of a program construct (e.g., whether the target of a variable is a file or socket). In another example, the customized compiler attribute may be assigned to indicate information about a source of a program construct (e.g., the library that includes a function being called). In either example, the customized compiler attributes can be associated with compiler functions that execute logic to evaluate the values. The compiler functions can be functions that are built into the compiler and can execute at compile time to process compiler attributes (e.g., define, set, test, evaluate a compiler attribute).

In one example, this technology can be used to enable a computer programmer to add customized code checks that are performed at compile time without changing the compiled version of the source code. The code checking can involve assigning compiler attributes to programming constructs and using compiler functions to evaluate the compiler attributes to check the programming constructs. Performing the code checking at compile time can detect errors that may otherwise not be apparent until runtime (e.g., logic error, semantic errors). This may be advantageous because the authors of the source code can configure the code checks instead of the author of the compiler. The authors of the source code may better understand when, where, and how to detect logic errors and this technology can enable them to choose particular programming constructs and particular locations in the source code where the programming constructs should be checked. In addition, avoiding changes to the compiled code may be particularly advantageous because a change to the compiled code may change the Application Binary Interface (ABI), the Application Programming Interface (API), or a combination thereof and may require recompiling every binary that makes calls to the compiled code. By avoiding the changes to the compiled code, a first computer programmer working on a first portion of source code (e.g., user application) can benefit from additional code checking added to a second portion of source code (e.g., kernel or system library) without having to rebuild and redistribute the second portion of source code.

In another example, this technology can be used to enable a computer programmer to provide information that the compiler can use to optimize and change the compiled code. The compiler attributes and logic provided by the author of the source code can enable the compiler to perform evaluations once at compile time and avoid evaluations from being included in the compiled code and evaluated multiple times at runtime. For example, there may be a situation where a programming construct can have different target types (e.g., target of descriptor can be TCP socket or UDP socket) and as a result the source code uses a generic function that can handle the different target types. The generic function may be less efficient because at runtime it may have to distinguish between the different target types of the programming construct and execute different code for each target type. In this instance, the technology can enable the author to modify the original source code to include a control flow statement (e.g., if statement) that is evaluated at compile time to determine the target of a programming construct (e.g., if descriptor is for TCP socket) and can replace a call to the generic function with a call to a specific function for a particular type of descriptor (e.g., function for TCP sockets). The compiler may be able to make the replacement because it determined at compile time using the customized compiler attributes and logic that all the different control flows result in a programming construct of the same particular type (e.g., descriptor for TCP sockets). The compiler can then optimize the compiled code by choosing the specific function instead of the generic function and avoid including the control flow statement or call to the generic function in the output code.

In this latter example, the technology described herein can enhance the technical field of compiler optimizations. In particular, aspects of this technology can enable an author of source code to use compiler attributes to provide information about programming constructs to the compiler. The information can be used to replace control flow statements (e.g., conditional statements) with compile-time constant expressions and avoid the compiled code from including or executing the conditional statement at runtime for each and every time the corresponding code path is traversed. The control flow statement can be evaluated at compile time and increase constant propagation and dead code elimination to make the compiled code execute faster and consume less computer resources (e.g., smaller storage size and less processor cycles).

Various aspects of the above referenced methods and systems are described in details herein below by way of examples, rather than by way of limitation. The examples provided below discuss source code that is authored by computer programmers that are human. In other examples, the source code can be authored, annotated, supplemented, or generated by computer programmers that are non-human and include one or more computer programs, robots, machines, wizards, artificial intelligence/machine learning techniques, or a combination thereof.

FIG. 1 depicts a block diagram illustrating an example computer programming environment 100 in which implementations of the disclosure may operate. Computer programming environment 100 may include a software development platform that enables computer programmers to design, develop, configure, integrate, test, and deploy computer programs. Computer programming environment 100 may use one or more native applications, web-based applications, cloud based applications, other applications, or a combination thereof. In one example, computer programming environment 100 may be implemented using one or more computers of the computer programmers. In another example, computer programming environment 100 may be a development platform that is hosted by a third party (e.g., Cloud Service Provider (CSP)). The development platform may include or be based on RedHat® OpenShift®, Microsoft® Azure Devops®, Oracle® Application Express® (APEX), other computer programming platform, or a combination thereof. In the example illustrated, computer programming environment 100 may include source code 110, authors 115A-Z, a compiler 120, and object code 130.

Source code 110 may include computer code that is written in a human-readable programming language. The programming language can be the same or similar to C, C++, C#Java, JavaScript, Python, Ruby, Rust, Basic, SQL, GO, R, Swift, PHP, other programming language, or a combination thereof. Source code 110 can include content for one or more computer programs and the content can include textual content, visual content, audio content, other content or a combination thereof. The textual content may include text 111 that can be modified by a text editor and may include plain text, formatted text, other text, or a combination thereof. Source code 110 can be stored as one or more files or other storage objects and can include source files, build files, configuration files, settings files, annotation files, object files, binary files, other files, or a combination thereof. Source code 110 can be a body of source code for building one or more computer programs and can include portions 112A-Z.

Portions 112A-Z can be used to organize and manage source code 110. Each of portions 112A-Z can be a portion of source code for one or more computer programs (e.g., executable or shared library), storage objects (e.g., source code file), library, class, function, structure, element, other unit, or a combination thereof. Each of portions 112A-Z can correspond to the same computer program, different computer programs, or a combination thereof. In one example, portion 112A can correspond to a first computer program (e.g., kernel, driver, or shared library) and portion 112Z can correspond to a second computer program that has a dependency on the first computer program (e.g., application or user program). The dependency can be a compile time dependency, an initialization time dependency, a runtime dependency, other dependency, or a combination thereof. Portions 112A-Z can be authored by one or more authors 115A-Z.

Authors 115A-Z can be an entity that generates source code 110 or generates modifications or annotation for source code 110. Authors 115A-Z may be the same or similar to computer programmers and may generate source code 110 by adding, removing, or modifying text 111. In one example, authors 115A-Z may include humans that use one or more computer programs (e.g., text editors) to generate source code 110. In another example, authors 115A-Z may include one or more computer programs (e.g., code generators, wizards) that generate source code 110 based on an input. The input may be training input, user input, other input, or a combination thereof. In either example, authors 115A-Z can generate source code 110 that includes one or more predefined or user defined programming constructs 114 and compiler attributes 116.

The term "predefined" and "user defined" may be based on what or when the definition or logic is provided to compiler 120. A programming construct or compiler attribute may be "predefined" when the definition or logic that is used by compiler 120 is determined by compiler 120 before compiler 120 begins compiling source code 110 and may be provided by the compiler, the programing language, other aspect of computer programming environment 100, or a combination thereof. A programming construct or compiler attribute may be "user defined" when at least some of the definition or logic that is used by compiler 120 is determined by compiler 120 after compiler 120 begins compiling source code 110 and may be provided by source code 110, by authors 115A-Z, or a combination thereof.

Programming construct 114 may be a unit of a computer program that may be defined in source code 110 in accordance with the rules of the programming language. Programming construct 114 may be defined using one or more lexical tokens in text 111 and may be the same or similar to a "language construct" or a "control structure." Programming construct 114 may be or include one or more variables, functions, input parameters, output parameters, labels, types, enumerators, statements, methods, elements, primitives, operators, structures, classes, objects, other programming construct, or a combination thereof. Programming construct 114 may be included in source code 110 as text and may be included in the compiled object code 130 as a data structure. Programming construct 114 may be associated with one or more compiler attributes 116.

Compiler attribute 116 may indicate one or more properties of programming construct 114 and may be used by compiler 120 to process source code 110. Compiler attribute 116 may be present in source code 110 that is input to compiler 120 and may be absent from object code 130 that is output by compiler 120. Compiler attribute 116 may be based on or be an extension to one or more internal compiler attributes. An internal compiler attribute may be defined by the author of compiler 120 and may be unmodifiable by source code 110 or authors 115A-Z. Internal compiler attribute may be instantiated by compiler 120 after beginning to compile source code 110 and may be used to propagate information about source code 110. This technology may enable the author of source code 110 to create customized compiler attribute by defining compiler attribute 116 in source code 110. Compiler attribute 116 may also or alternatively referred to as a user defined compiler attribute, customizable compiler attribute, an external compiler attribute, other term, or a combination thereof. Compiler attribute 116 may include one or more attribute values 118.

Attribute values 118 may include any value that can be defined in source code 110 and interpreted by compiler 120. Each of the attribute values 118 may correspond to a data type, a data item, or a combination thereof. The data type may be the same or similar to a string, integer, boolean, floating point, built-in data type, predefined data type, user defined data type, or a combination thereof. The data item can be created by the author of the source code and can include any user defined set of characters that can be interpreted by compiler 120. One or more of attribute values for a particular compiler attribute can have the same data type (e.g., string 1 and string 2), different data types (e.g., string and integer), or a combination thereof. The data types of attribute values 118 can be the same or different from the data type of programming construct 114. In the example shown in FIG. 1, source code 110 can be updated to include a call to the predefined compiler function (e.g., "attribute") and one or more user defined attribute values 118 as input parameters (e.g., a first string value of "TargType" and a second string value of "TCP"). This may define compiler attribute 116 and assign it to programming construct 114 (e.g., integer variable). The compiler attribute 116 and attribute values 118 may be used by compiler 120.

Compiler 120 may include one or more computer programs that translate computer code in one programming language (e.g., a source language) into computer code in another language (e.g., a target language). Compiler 120 can translate computer code in a higher-level programming language (e.g., C++, Java) to computer code in a lower-level programming language (e.g., assembly language, bytecode). Compiler 120 can be the same or similar to an executable program compiler and may take computer code as input (e.g., source code) and produce executable code that can execute on one or more computing devices (e.g., executable code).

Compiler 120 may also or alternatively be a cross-compiler, source-to-source compiler, boot strap compiler, reverse compiler, code translation program, interpreter, or a combination thereof. A cross-compiler can produce code for a different CPU or operating system than the one on which the cross-compiler itself runs. A source-to-source compiler may translate computer code between high-level languages. A bootstrap compiler can be written in the language that it intends to compile. A reverse compiler can translate computer code from a low-level language to a higher-level language and be the same or similar to a decompiler or disassembler. A compiler-compiler may be a compiler that is used to produce a compiler or part of a compiler. As defined herein, compiler 120 can be the same or similar to an interpreter or may include an interpreter. The interpreter may directly execute programming code without requiring the computer code to be translated into another programming language. In the examples discussed above, compiler 120 can analyze and translate the computer code using functions 121.

Functions 121 can be functions that are built into compiler 120 by the developer of compiler 120 and can include internal functions, external functions, or a combination thereof. The internal functions may be used by the compiler and may be inaccessible by source code 110 (e.g., unable to be called in source code 110). The external functions may be used by the compiler and may be accessible by source code 110 (e.g., able to be called from source code 110). The external functions may be called from any location in source code 110 and may enable a computer programmer or program to define, create, update, or evaluate one or more compiler attributes.

Functions 121 for compiler 120 can include an attribute defining function, an attribute updating function, an attribute evaluating function, other attribute processing function, or a combination thereof. The attribute defining function may be used to define the compiler attribute and its attribute values (e.g., attribute ("type", "TCP")). The attribute defining function may also associate compiler attribute with a particular instance of a programming construct (e.g., assign compiler attribute to a variable). Defining a compiler attribute can be the same or similar to creating, declaring, instantiating, or generating the compiler attribute. The attribute updating function may be a compiler function that may be used to update one or more attribute values 118 of compiler attribute 116 (e.g., _builtin_set_attr (variableD, "type", "TCP")). The update may be the same or similar to setting, replacing, appending, adding, subtracting, clearing, removing, comparing, combining, changing, modifying, or editing one or more attribute values 118.

The attribute evaluating function may be used to evaluate one or more compiler attributes and may use predefined logic (e.g., internal compiler logic), user defined logic (e.g., external logic, logic 119), or a combination thereof. Attribute values 118 may be evaluated individually, evaluated as a combination, or a combination thereof. For example, attribute values 118 may include a first attribute value (e.g., user defined name of compiler attribute 116) and a second attribute value (e.g., user defined value of compiler attribute 116) that may be stored separately or together. The compiler function may evaluate the attribute values individually or together (e.g., as a pair or tuple). In one example, the compiler can evaluate whether one of the attribute values is a particular value and depending on the evaluation can proceed to evaluate or update one or more of the other attribute values. In another example, the compiler can update or evaluate the first or second attribute values independent of the other. In one example, there may be an attribute evaluation function that is referred to as a phi function and may evaluate, combine, update, or process compiler attributes as discussed in more detail below in regards to FIGS. 3-5.

Figure 2:
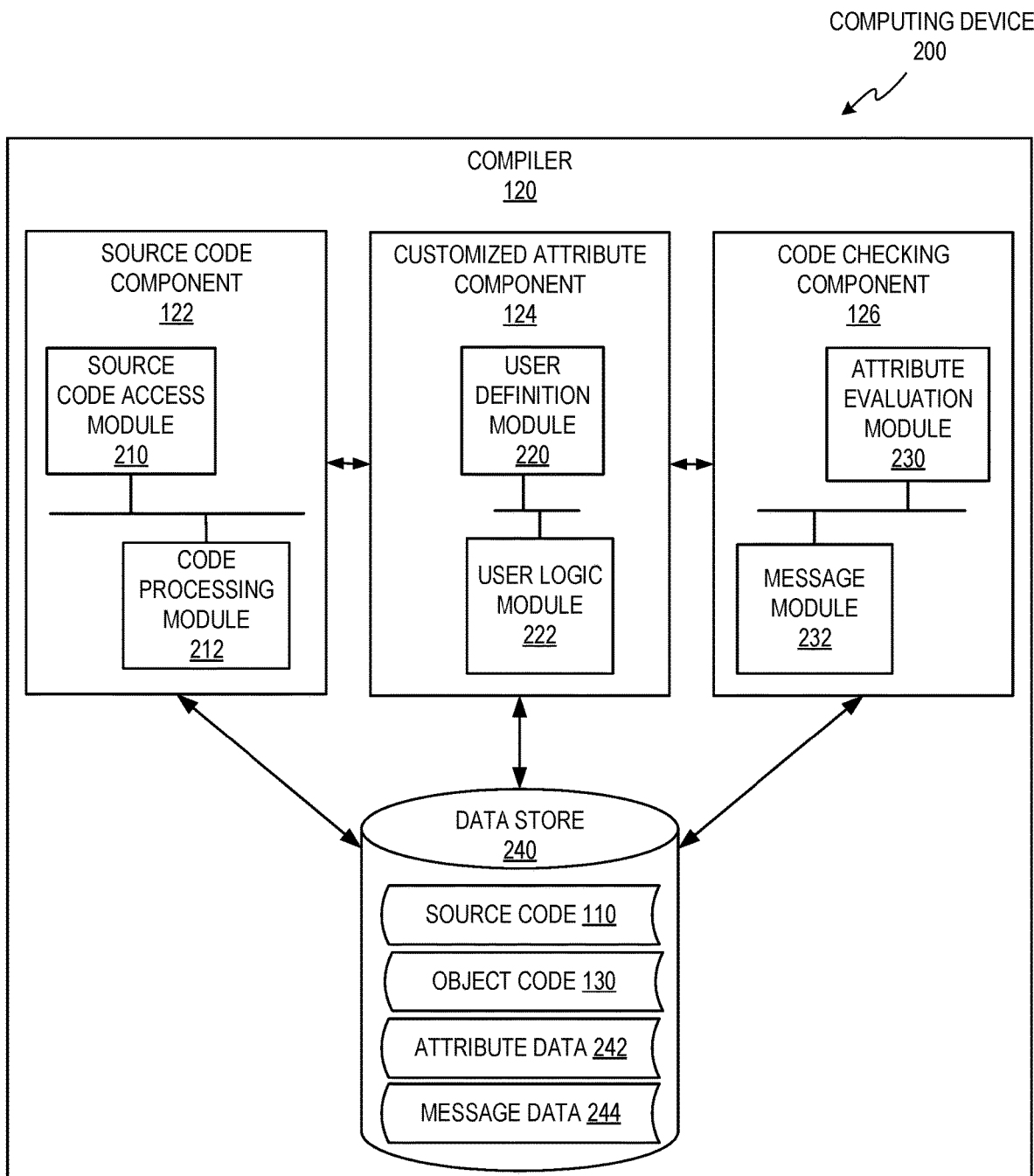
FIG. 2 depicts a block diagram of an example compiler and its components and modules, in accordance with one or more aspects of the present disclosure.
Figure 5:
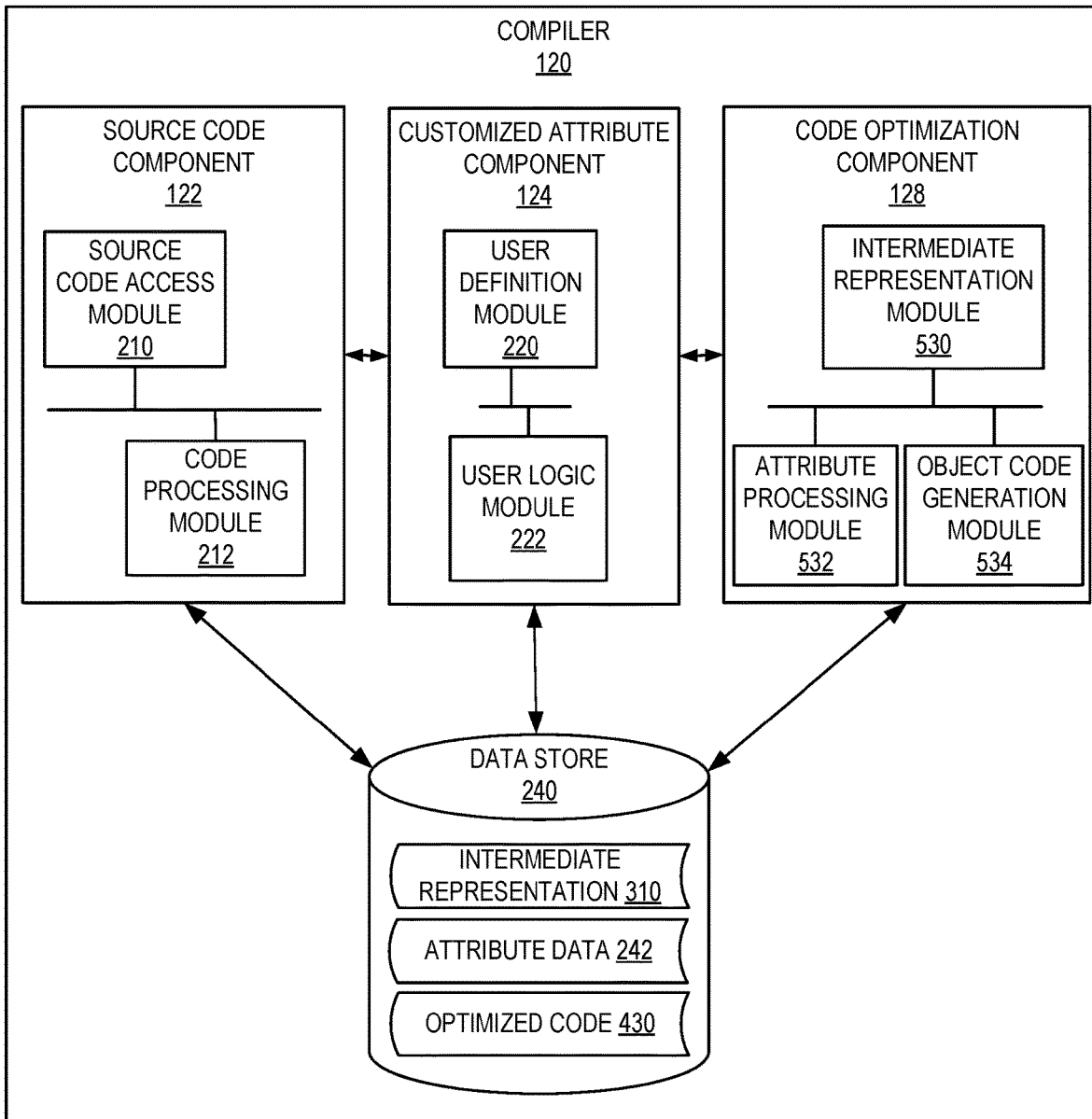
FIG. 5 depicts a block diagram of another example compiler and its components and modules, in accordance with one or more aspects of the present disclosure.

As shown in FIG. 1, compiler 120 may also include a source code component 122, a customized attribute component 124, a code checking component 126, and a code optimization component 128, which are discussed in more detail in regards to FIG. 2 and FIG. 5. Compiler 120 can use these components and to access source code 110 and generate object code 130.

Object code 130 may refer to any output of a compiler and may be the result of the compiling process. Object code 130 can be in a programming language that is the same or different from source code 110. Object code 130 may include a sequence of statements or instructions in a machine readable language (e.g., executable code, machine code) or can be in an intermediate language (e.g., byte code) that can be further translated before being executed by a computing device. Object code 130 may include the programming constructs that are in source code 110 and may be absent the compiler attributes and compiler logic that are included in source code 110, as discussed in more detail in regards to FIGS. 2 and 5.

FIG. 2 depicts a block diagram illustrating an example compiler 120 that can be executed by computing device 200 and uses customizable compiler attributes to enhance code checking of source code, in accordance with one or more aspects of the present disclosure. Computing device 200 can be or include one or more user devices (e.g., developer machines), server devices (e.g., cloud host machines), or a combination thereof. The features discussed in regards to components and modules of FIG. 2 may be performed by any portion of computer programming environment 100 and may be executed by a compiler as illustrated or by a build tool, code analysis tool, integrated development environment (IDE), text editor, other computer program, or a combination thereof. In the example illustrated in FIG. 2, compiler 120 may include a source code component 122, a customized attribute component 124, and a code checking component 126.

Source code component 122 may enable compiler 120 to access and process source code 110. Source code 110 may be stored at a storage location that is local to computing device 200 (e.g., local hard drive), remote from computing device 200 (e.g., network storage or database), or a combination thereof. In one example, source code component 122 may include a source code access module 210 and a code processing module 212.

Source code access module 210 may enable compiler 120 to access source code that includes one or more compiler attributes and programming constructs. Source code access module 210 may access source code that is stored at the storage location. The source code can be a body of source code that includes many files. In one example, the programming constructs and corresponding compiler attributes can be stored together and be included in the same source file. In another example, the programming constructs and their corresponding compiler attributes can be stored separately and be included in different source files. For example, a first source file can include code for the programming constructs and be absent code for the compiler attributes and a second source file can include code for one or more compiler attributes and be absent the code for the programming construct. In either example, source code access module 210 can access the source code so that it is available to be processed by compiler 120.

Code processing module 212 may enable compiler 120 to process source code. Processing the source code can involve performing one or more compilation phases that include preprocessing, lexical analysis, parsing, semantic analysis (e.g., syntax-directed translation), intermediate representation generation, code optimization, object code generation, linking, other phase, or a combination thereof. Code processing module 212 may detect the customized compiler attributes and the calls to the compiler functions that evaluate the compiler attributes. The detecting can occur at one or more of the compilation phases (e.g., parsing, semantic analysis).

Customized attribute component 124 may enable compiler 120 to process customized compiler attributes. As discussed above, the compiler attributes can be customized by a computer programmer or program and can include a user defined definition and user defined logic. The definition and logic associated with a compiler attribute can be derived from the source code by code processing module 212 and stored as attribute data 242 in data store 240. In one example, customized attribute component 124 may include a user definition module 220 and a user logic module 222.

User definition module 220 may enable compiler 120 to determine the definition of one or more customized compiler attributes. As discussed above, the source code may include a definition of the compiler attribute that was provided by the author of the source code being compiled, as opposed to a developer of the compiler. The definition may include a call to a predefined compiler function (e.g., attribute defining function) and may include one or more input parameters that identify the user defined values for the compiler attribute. A user defined value can be any value that is defined (e.g., created, imagined, or provided) by an author of the source code. The user defined values for the compiler attribute can correspond to a user defined attribute name, a user defined attribute type, or a user defined attribute value.

User logic module 222 can enable compiler 120 to determine the logic 119 for one or more customized compiler attributes. Logic 119 may be provided by the user of the compiler and be referred to as user defined logic (e.g., external logic) as opposed to compiler defined logic (e.g., internal logic). Logic 119 can be added as text the source code 110 by the author of the source code (e.g., original author), by another author (e.g., code annotator), or a combination thereof. Logic 119 can be interpreted and executed by compiler 120 and used to evaluate one or more compiler attributes at compile time. Compile time may be any time between accessing the source code for the compilation process and storing the output object code (e.g., storing the built executable).

Logic 119 may include attribute testing logic, attribute updating logic, or attribute combining logic. The attribute testing logic may perform one or more comparisons to test a compiler attribute. A comparison may involve comparing inputs that include one or more attribute values of one or more compiler attributes and producing an output (e.g., test result). In one example, the attribute testing logic may include test values and compare the attribute values of a compiler attribute to the test values and output a test result indicating whether they are the same. The attribute testing logic is discussed in more detail below in regards to attribute testing 419. The attribute updating logic may include logic to update the attribute value of one or more compiler attributes. The update may occur before, during, or after executing attribute testing logic. Attribute combining logic can involve combining values of different compiler functions and may include a combination of attribute testing logic, attribute updating logic, other logic, or a combination thereof. The attribute combining logic is discussed in more detail below in regards to attribute combining 319.

Code checking component 126 can enable compiler 120 to use the customized compiler attributes to perform code checking of source code 110. The code checking can involve using compiler functions to evaluate customized compiler attributes that have been assigned to programming constructs. Performing the code checking at compile time can detect errors that may otherwise not be noticed until runtime (e.g., logic error, semantic errors). This may be advantageous because the computer programmer may be the author of the source code and may better understand when, where, and how to detect the errors and can use the customized compiler attributes to target particular programming constructs at particular locations in the source code. In one example, code checking component 126 may include an attribute evaluation module 230 and a message module 232.

Attribute evaluation module 230 can enable compiler 120 to evaluate one or more customized compiler attributes to check the corresponding programming constructs. The evaluation may occur by a function of the compiler (e.g., built-in compiler function) that uses the user defined logic to evaluate the compiler attribute associated with the programming construct. The user defined logic may function as rules for evaluating the customized compiler attribute. For example, a compiler attribute can be associated with a particular programming construct and represent a property of the programming construct that may not be otherwise accessible or determinable by the compiler. As discussed above, the user defined logic can be used to process the compiler attributes and involve performing one or more tests (e.g., comparisons of attribute values), updates (e.g., setting or clearing attribute values), combinations (e.g., merging or overwriting attribute values), other processing, or a combination thereof.

The evaluations of the compiler attributes can occur at one or more locations in the source code. The locations can be selected by the author and identified in source code 110. The locations can correspond to locations in which the programming construct is being used. The programming construct may be "used" or "in use" at a location in the source code where it is declared, defined, instantiated, executed, updated, accessed, provided as input/output, other operation, or a combination thereof. The evaluation of the compiler attributes can occur before, during, or after the programming construct is used.

The technology can be used in a variety of use cases that involve different programming constructs. In one example, the programming construct can be a descriptor variable (e.g., Linux descriptor or Microsoft handle) and the customizable compiler attribute can be used to check the target of the descriptor variable before the descriptor variable is used. A descriptor variable may be a simple integer that is provided by a kernel to a user space process and may function as a ticket that corresponds to a data structure. The kernel can subsequently receive the descriptor variable as input from a user space process and may resolve the descriptor variable to the corresponding target data structure (e.g., map descriptor integer to a socket data structure).

The target data structure can have a one of a variety of different types that include files, sockets (UDP or TCP), locks, devices, other resource, or a combination thereof. The descriptor variable itself does not indicate the target type and an error may occur when a descriptor variable corresponding to one target type (e.g., file) is passed as input to a function that expects a descriptor variable of a different target type (e.g., socket). The error may not occur at compile time because the input parameter for the operator requires a descriptor variable and it received a descriptor variable. The error may instead occur at runtime because at that point the function may attempt to use the descriptor variable and it may resolve to a data structure that is different from what is expected (e.g., a file instead of a socket).

This technology can be used to detect this and other errors at compile time by using the customizable compile attributes. This may involve updating the source code to associate descriptor variables with a respective compiler attribute that indicates the target type of the respective descriptor variable. In one example, this can be done by updating the declaration statement of each descriptor variable to include a call to a predefined compiler function with one or more user defined attribute values that indicate the target type (e.g., "socket" and/or "TCP"). The source code can also be updated at the locations in the source code where the descriptor variable should be checked. For example, the source code can be updated to evaluate the compiler attribute at locations where the descriptor variable is used (e.g., descriptor variable received as input to an operator so data structure can be modified). The update can involve adding a call to another predefined compiler function that uses the user defined logic to evaluate the compiler attribute associated with the descriptor variable. In one example, the compiler function can evaluate the user defined logic to check that the target type of the descriptor variable matches an input type for an operator.

The author updating the source code to add a compiler attribute can be the same or different from the author updating the source code to evaluate the compiler attribute. In one example, a first author may associate a compiler attribute to a pre-existing programming construct added by another author or may add both the compiler attribute and programming construct. The user defined logic to check programming constructs may be provided by the first author or a second author. The different authors may have different experience levels (e.g., junior programmer versus a senior programmer), different specialization (e.g., kernel programmer verse application programmer), different access (e.g., no write access to portion of source code), different tools (e.g., missing tool to modify GUI), other differences, or a combination thereof.

The portions of the source code being updated to add the compiler attribute can be the same or different from the portion of the source code being updated to add the call to evaluate the compiler attribute. For example, the compiler attribute can be defined in a first portion of the source code (e.g., code for application or user level program) and the call to evaluate the compiler attribute can be added to a second portion of the source code (e.g., code for kernel, driver, shared library, or system program).

Message module 232 can enable compiler 120 to determine whether to generate a message based on the evaluation of the compiler attribute. Message module 232 may make the determination based on the user defined logic executed by the compiler function. The message may include data that is stored in data store 240 as message data 244. Message data 244 may indicate one or more compiler attributes (e.g., attribute values), programming constructs (e.g., variables, functions), logic (e.g., comparison, expected value), location (e.g., source file name, line number, module, class, function), compiler functions (e.g., function call or input parameters), other data, or a combination thereof. Message data 244 may also or alternatively include data that indicates a status. The status may be a status of the check of the program construct (e.g., evaluation result), the execution of the logic, the compiler function, or a combination thereof. The status may include a type or severity (e.g., error, warning, informational). In one example, the message may indicate a status of the check of the programming construct (e.g., mismatched between actual and expected target type of descriptor variable).

Message module 232 may enable compiler 120 to provide a message that includes message data 244 to one or more recipients. The recipients may be a user or program for authoring, reviewing, analyzing, compiling, building, packaging, deploying, testing, delivering, or a combination thereof. The message may be provided by storing or transmitting the message to a particular storage object (e.g., log file), a particular program (e.g., integrated development environment, event viewer), a particular device (e.g., build management server), other location, or a combination thereof. Message module 232 may provide the message before, during, or after generating object code 130.

Compiler 120 may generate object code 130 based on source code 110. Compiler 120 may receive source code 110 as input and output object code 130. The compiler attributes and the calls to the compiler functions for evaluating the compiler attribute may be present in the input source code 110 and may be absent from output object code 130. In one example, updating an existing body of source code to add compiler attributes and calls to compiler functions may have no effect on the object code being generated. As a result, the new object code generated from the updated source code may be a duplicate of the prior object code generated from the preexisting source code.

A first object code and a second object code may be duplicates if they are identical (e.g., bit-for-bit identical) or if they are semantically identical (e.g., same semantics but different bit padding or arrangement). The duplicates may have the same Application Binary Interface (ABI), the same Application Programming Interface (API), or a combination thereof. In the examples discussed above, the compiler attributes may be included without changing the output object code 130. In the examples discussed below, the compiler attributes may be included and may change the object code 130 to be more optimized (e.g., less code, less branching, faster or more efficient execution or storage).

Figure 3:
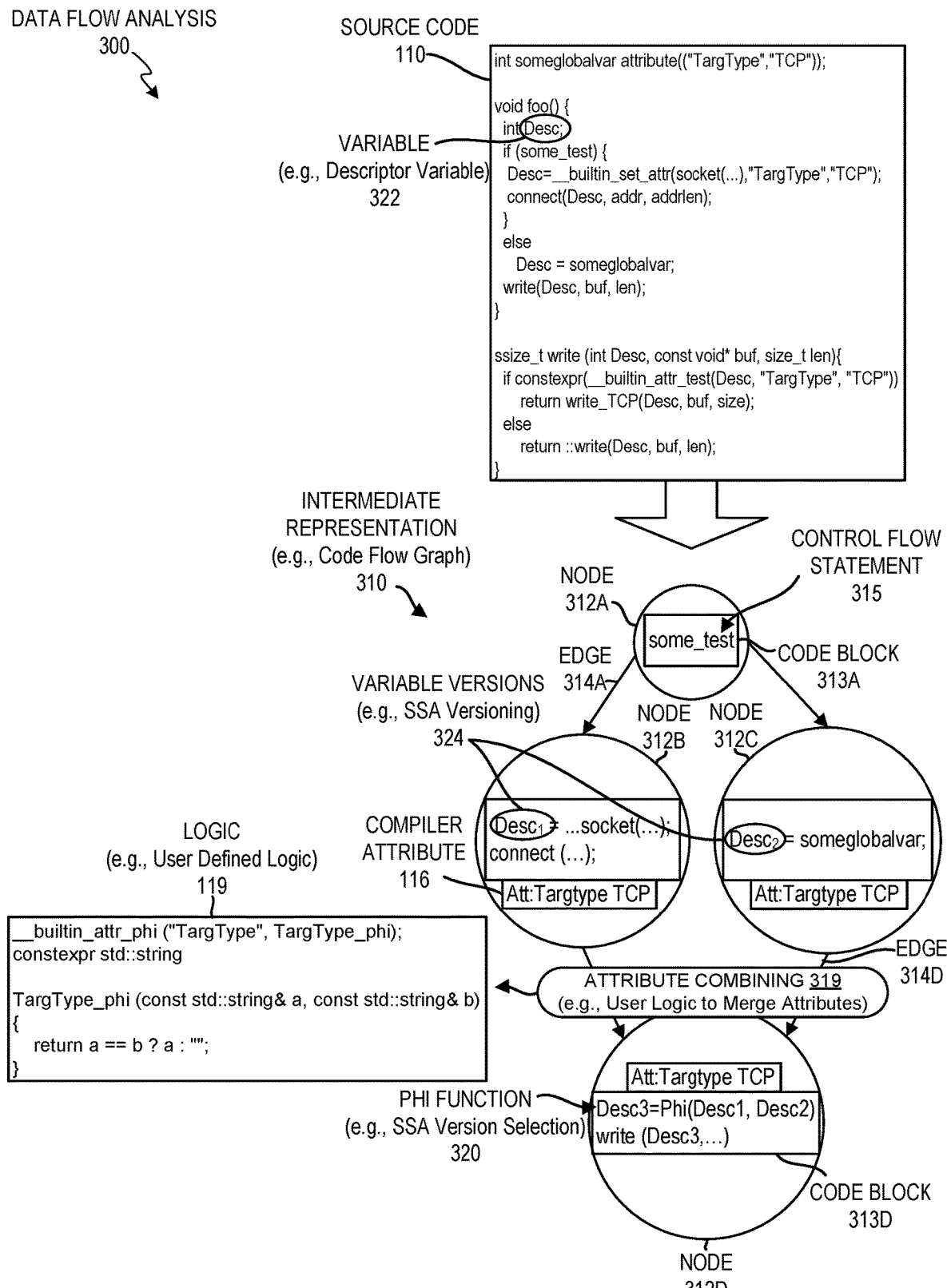
FIG. 3 depicts a block diagram of an example of the data flow analysis performed by the compiler, in accordance with one or more aspects of the present disclosure.

FIG. 3 depicts a block diagram illustrating an example data flow analysis 300 that is performed by compiler 120 and uses customized compiler attributes to enable code optimizations, in accordance with one or more aspects of the present disclosure. Data flow analysis 300 may be a technique for gathering information about the possible set of data values at different points in the execution of a computer program. As illustrated in FIG. 3, data flow analysis 300 may involve source code 110 and an intermediate representation 310.

Intermediate representation 310 may be a data structure that is used internally by compiler 120 and represents the data flow and control flow of source code 110. Compiler 120 may generate intermediate representation 310 from source code 110 and may use intermediate representation 310 to perform data flow analysis 300. The data structure can be or include a graph that indicates the control flow of a computer program and may be the same or similar to a Control Flow Graph (CFG). The control flow graph may be a Directed Acyclic Graph (DAG) with directed edges that are absent loops.

The graph may include one or more nodes 312A-D and edges 314A-D that represent the available paths that a computer program may traverse during execution. Nodes 312A-D may represent respective code blocks 313A-D and may be connected to other nodes by edges 314A-D. Each of code blocks 313A-D can include a block of code derived from source code 110. Each of code blocks 313 may be a basic block and may include a straight-line code sequence with no branches in except to the entry and no branches out except at the exit (e.g., one entry point and one exit point per block). Edges 314A-D may represent jumps in the control flow and the option between edge 314A and 314B may be the result of a control flow statement 315 (e.g., "some test," if statement, while loop, for loop).

Intermediate representation 310 may comply with a Static Single Assignment Form (SSA Form or SSA). The SSA Form is a property of intermediate representation 310 in which each variable is assigned once. When source code includes a variable that is assigned more than once the variable may be represented by different versions of the variable in intermediate representation 310 so that each version of the variable is assigned once. Each version of the variable can be represented as the variable with a subscript that represents the version and different versions of the variable can have different numeric subscripts (e.g., version numbers). The use of different variable versions gets more complex when different code paths include assignments to the same variable, which are now represented by the different variable versions. Compiler 120 may use a phi function 320 to determine which of the variable versions to use.

In the example of FIG. 3, source code 110 may include a variable 322 that is assigned multiple times and intermediate representation 310 may replace variable 322 (e.g., descriptor variable "Desc") with different variable versions 324 (e.g., $Desc_1$ and $Desc_2$). Variable versions 324 may include a first variable version that may be assigned in a first code path that traverses node 312B (e.g., $Desc_1$=... socket(...)) and may include a second variable version that may be assigned in a second code path that traverses node 312C (e.g., $Desc_2$=someglobalvar). Both code paths may converge at node 312D where the variable is used in code block 313D. The version of the variable that is used may be either the first variable version or the second variable version depending on the code path that was traversed. To account for this, a phi function 320 may be used and the output of phi function 320 may be assign to a third variable version (e.g., $Desc_3$). Phi function 320 may select (e.g., output) the first variable version for the first code path and the second variable version for the second code path. The versions of variable 322 may be associated with the same compiler attribute 116.

Compiler attribute 116 may be included in intermediate representation 310 and may be used to propagate information about a programming construct throughout the graph. In the example of FIG. 3, compiler attribute 116 may be associated with variable 322 and can provide information about variable 322 to compiler 120. Each time variable 322 is assigned, compiler attribute 116 can be updated based on the assignment. As discussed above, different control flows can result in different assignments and phi function 320 can be used to merge the variable versions. A similar issue may arise with compiler attribute 116 because compiler attribute 116 can be updated to a first set of one or more attribute values in node 312B as a result of the first assignment and can be updated to a second set of one or more attribute values in node 312C as a result of the second assignment. At node 312D the code paths may converge and compiler attribute 116 from different code paths may be evaluated and merged using logic 119 (e.g., phi logic).

Logic 119 may be user defined logic that is used by compiler 120 to process one or more user defined compiler attributes 116. Processing compiler attribute 116 can involve creating, updating, testing, evaluating, combining, or other processing of compiler attribute 116, as discussed above in regards to compiler functions 121. Logic 119 may be provided by an author of source code 110 and included as text in source code 110. Logic 119 may be accessed by a compiler 120 at compile time and evaluated by compiler 120. As illustrated in FIG. 3, logic 119 may be used to perform attribute combining 319.

Attribute combining 319 may process user defined compiler attributes and may be the same or similar to a phi function and may be an extension to phi function 320. Attribute combining 319 may use logic 119 that is provided by the author of the source code to combine compiler attributes from different control flows. The author may update the source code to add a call to a particular compiler function (e.g., _builtin_attr_phi) to register logic 119 that compiler 120 will use to combine the compiler attributes. Attribute combining 319 may execute logic 119 and perform one or more evaluations that compare attribute values and may update one or more of the attribute values with one or more replacement attribute values. A replacement attribute value may be one of the input attribute values (e.g., first or second input value), a combination of multiple input values (e.g., added values, appended values), a null value (e.g., empty string), a default value (e.g., 0, ffff), a delta value (e.g., difference between input values), other value, or a combination thereof. For example, user defined logic 119 may recite "a==b?a: """ and this may cause compiler 120 to compare the input attribute value "a" with input attribute value "b" and if they are equal, the logic uses attribute value "a" and if they are not equal the logic uses another value (e.g., empty string). Logic 119 and attribute combining 319 are discussed in more detail below in regards to FIGS. 4A-4B.

Figure 4A:
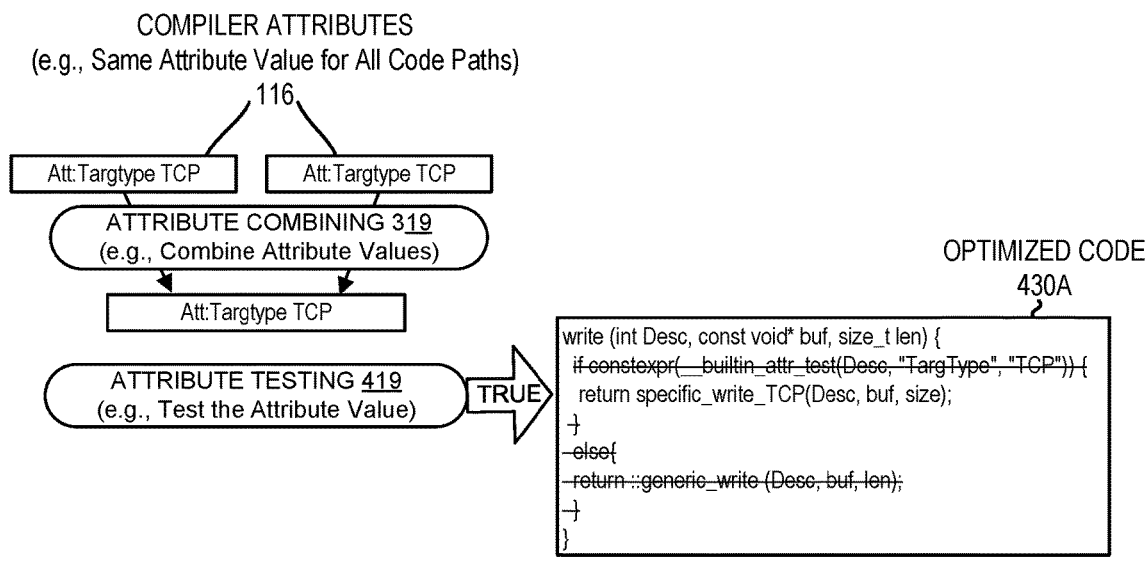
FIG. 4A and FIG. 4B depict block diagrams of example optimized code generated by the compiler, in accordance with one or more aspects of the present disclosure.
Figure 4B:
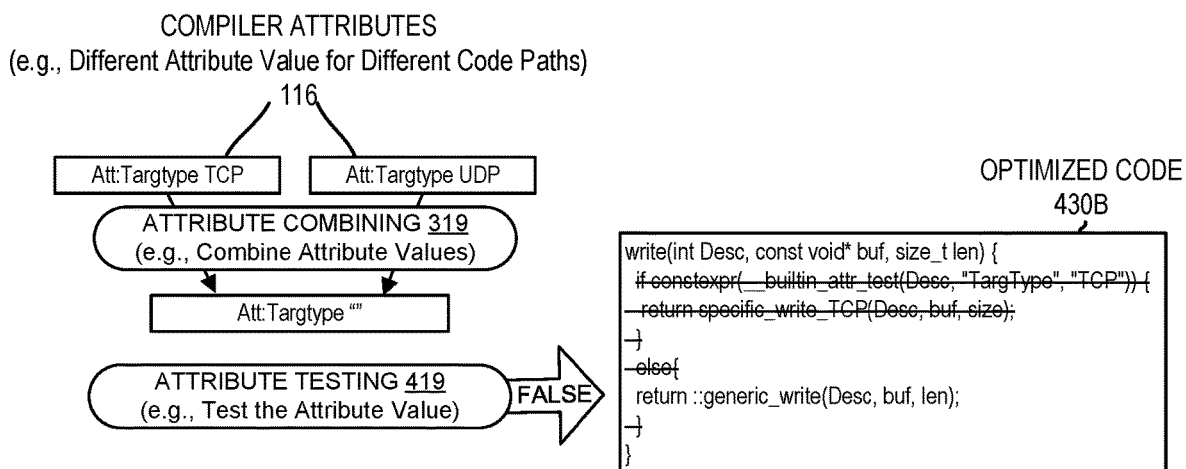

FIGS. 4A and 4B depict block diagrams illustrating how the compiler technology can enable an author of source code 110 to update the source code to optimize the output generated by compiler 120. For example, there may be a situation where a programming construct can have different target types (e.g., target of descriptor can be TCP socket or UDP socket) and this causes generic functions to be used to process the programming construct. The generic functions may evaluate the programming construct at run time and select a specific function that corresponds to the actual target type. This technology can enable the author of the source code to add in customized compiler attributes and logic so that the programming construct can be evaluated at compile time and may use a specific function instead of the generic function.

FIGS. 4A and 4B both involve using user defined logic to combine and test the compiler attributes to determine whether different control flows have programming constructs that have the same property. This may enable the compiler to perform an evaluation at compile time and avoid the evaluation from being included in object code and performed at runtime. The compiler may use the information provided by the user defined compiler attribute to determine that programming constructs provided as input to a function always correspond to a specific type. This enables the compiler to optimize the code to call a specific function (e.g., specific operator) instead of a generic function (e.g., generic operator). The specific function may be more computationally efficient because at runtime it may avoid steps performed by the generic function, which may include determining the property of the programming construct and selecting different functions based on the determined property. For ease of explanation, the code optimization is described using a programming construct that is a descriptor variable and the compiler attribute indicates the target type of the descriptor variable.

FIG. 4A illustrates an example where compiler 120 uses the compiler attributes to determine that all control flows result in the descriptor variable having the same target type (e.g., a TCP). For example, compiler attributes 116 correspond to two different control flows and include the same attribute value (e.g., "TCP"). When performing data flow analysis, compiler 120 can perform attribute combining 319 to combine the compiler attributes from the different control flows and the result is a combined compiler attribute that has the same attribute value (e.g., "TCP"). Compiler 120 may then use attribute testing 419 to execute user defined logic to test the combined compiler attribute by comparing it with a test value (e.g., TCP). As shown in FIG. 4A, the attribute testing 419 evaluates to "TRUE" and enables compiler 120 to generate a call to the specific and hence optimized function (e.g., specific write TCP) and removes the remaining code that includes a call to the generic function. The result is as if then author would have written source code 110 without the source code lines stricken out, as illustrated by optimized code 430A.

FIG. 4B illustrates an example where compiler 120 uses the compiler attributes to determine that the different control flows result in descriptor variables with different target types (e.g., one is TCP descriptor and one is a UDP descriptor). For example, compiler attributes 116 correspond to two different control flows and include different attribute values (e.g., "TCP" or "UDP"). When performing data flow analysis, compiler 120 can perform attribute combining 319 to combine the compiler attributes from the different control flows and the result is a combined compiler attribute. Using logic 119 discussed above, the combined compiler attribute may have an empty value (" ") because the attribute values were not the same (e.g., "TCP" not equal to "UDP"). Compiler 120 may then use attribute testing 419 to execute user defined logic to test the combined compiler attribute by comparing it with a test value (e.g., TCP). As shown in FIG. 4B, the attribute testing 419 evaluates to "FALSE" and enables compiler 120 to generate a call to the generic and non-optimized function (e.g., generic write) and removes the remaining code that includes a call to the specific function.

FIG. 5 depicts a block diagram illustrating another example compiler 120 that can be executed by computing device 200 and uses customizable compiler attributes to perform code optimizations, in accordance with one or more aspects of the present disclosure. In the example illustrated, compiler 120 may include source code component 122 and customized attribute component 124 that are discussed above in regards to FIG. 2. Compiler 120 of FIG. 5 may also include a code optimization component 128 in addition or as an alternative to code checking component 126.

Code optimization component 128 can enable compiler 120 to perform code optimizations that use the user defined compiler attributes to generate optimized object code. This may involve generating intermediate representation 310, performing data flow analysis, and generating optimized object code as discussed above in regards to FIGS. 4A-4B. In one example, code optimization component 128 may include an intermediate representation module 530, an attribute processing module 532, and an object code generation module 534.

Intermediate representation module 530 may enable compiler to generate one or more intermediate representations based on source code 110. The one or more intermediate representations may be stored in data store 240 and include an Abstract Syntax Tree (AST), Control Flow Graph (CFG), other graph data structure, or a combination thereof. As shown in FIG. 3, intermediate representation 310 may be or include a graph that indicates the control flow of a computer program and may include multiple control flows (e.g., Node 312B and Node 312C) that each include the same variable and compiler attribute. In one example, intermediate representation module 530 may generate or update intermediate representation 310 to comply with an SSA Form by replacing the target variable of each assignment with a new variable version corresponding to the version of the variable reaching that point. (e.g., Desc=someglobalvar→Desc$_2$=someglobalvar).

Attribute processing module 532 may enable compiler 120 to process one or more customized compiler attributes using logic provided in source code 110 by the author of source code 110. Compiler 120 may execute a function of the compiler (e.g., built-in compiler function) that uses the user defined logic to process the compiler attributes. Processing the compiler attributes may involve performing one or more combinations (e.g., merging or overwriting attribute values), tests (e.g., comparisons of attribute values), other operations, or a combination thereof. The user defined logic may function as rules for processing the customized compiler attributes. Attribute processing module 532 may perform attribute combining 319 and attribute testing 419 discussed above using the same compiler function or different compiler functions.

In one example, compiler 120 may use different compiler functions and the source code may include one or more calls to a first predefined compiler function and one or more calls to a second predefined compiler function. The first predefined compiler function (e.g., _builtin_attr_phi ( . . . )) may be used to register the user defined attribute combining logic to evaluate input compiler attributes and output a combined compiler attribute. The input compiler attributes can be different compiler attributes or different versions of the same compiler attribute (e.g., different control flows). The second predefined compiler function (e.g., _builtin_attr_test ( . . . )) may use the user defined attribute testing logic to evaluate and test compiler attributes (e.g., compare attribute values) and generate attribute data 242 that is based on the result of the test and includes or indicates the result of attribute testing 419 (e.g., true/false, 0/1, yes/no).

Object code generation module 534 may use the attribute data 242 (e.g., result of_builtin_attr_test) to optimize object code generated from source code 110. In one example, source code 110 is updated by the author to include a control flow statement 315 (e.g., If statement, a while loop, or a for loop) and the compiler uses compiler attribute 116 and logic 119 to evaluate the control flow statement at compile time to use a specific function instead of a generic function. The control flow statement 315 is not included in the object code and not evaluated at runtime. For example, compiler 120 can detect that the compiler attribute defined in the source code is assigned to each of a plurality of descriptor variables and based on attribute data that indicates each of the descriptor variables comprise a target type that is a network socket can optimize the object code to include a call to a specific function that handles network sockets and to be absent a call to a generic function that handles multiple target types.

Figure 6:
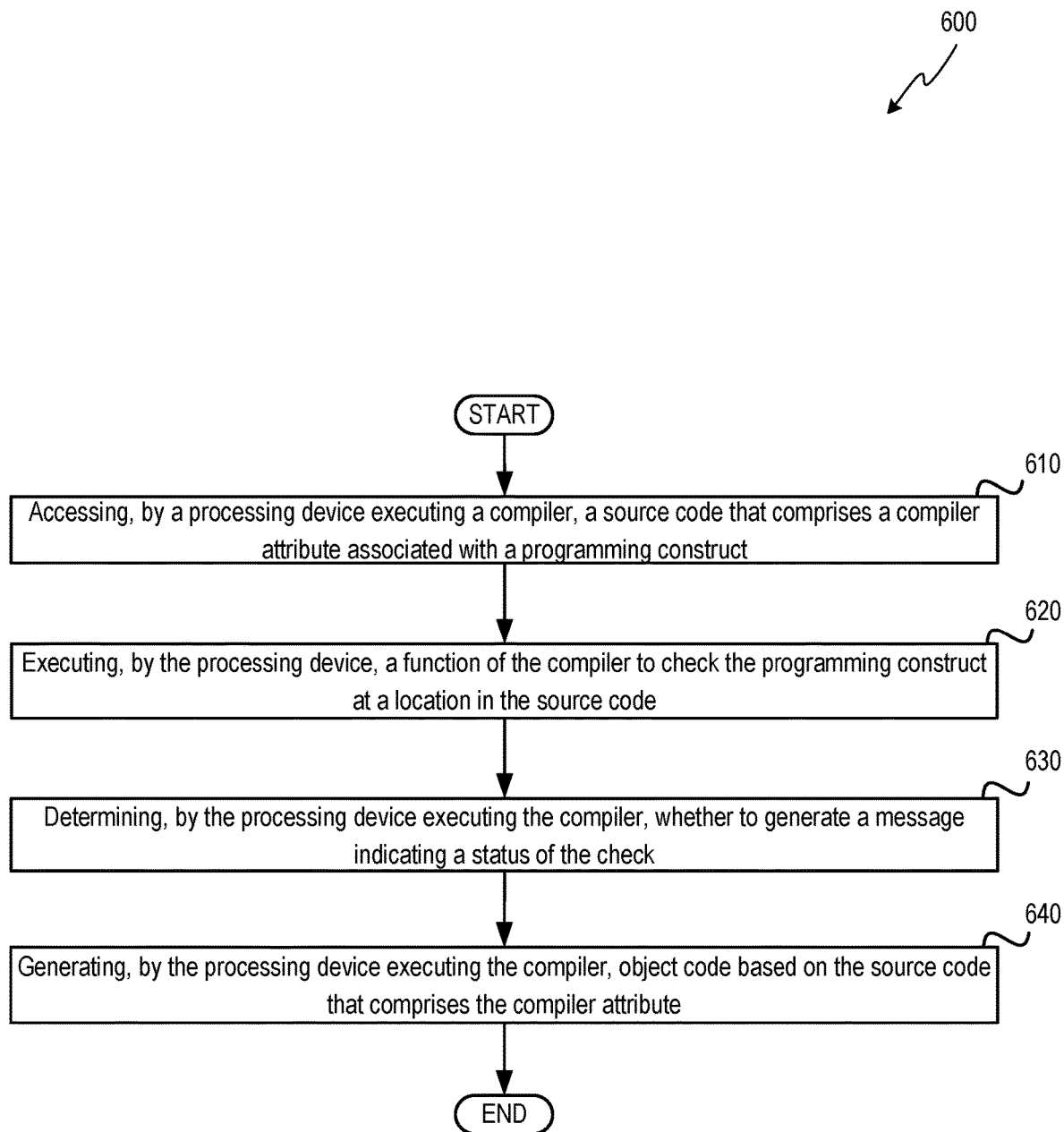
FIG. 6 depicts a flow diagram of an example method for using customizable compiler attributes to perform code checking, in accordance with one or more aspects of the present disclosure.
Figure 7:
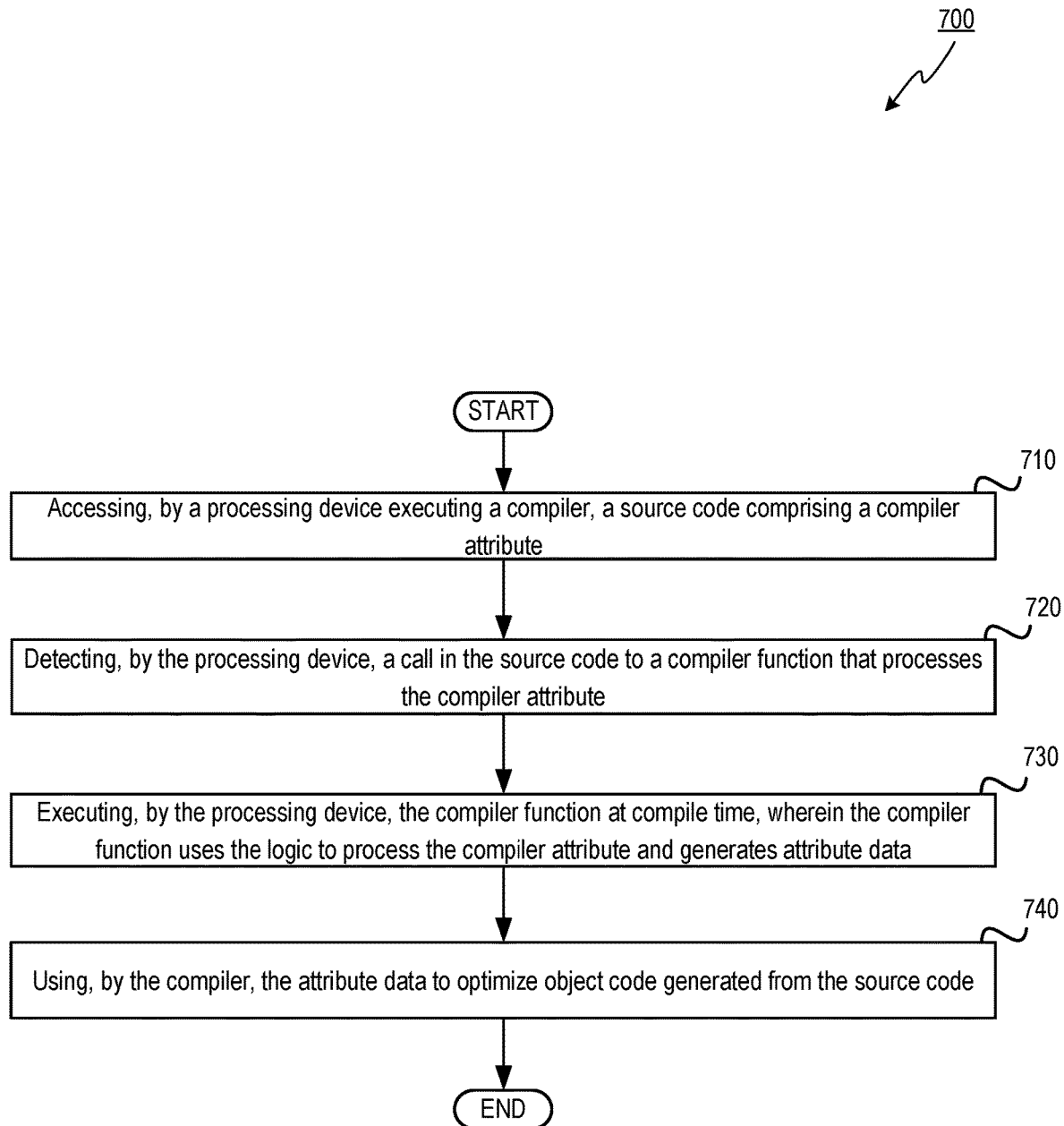
FIG. 7 depicts a flow diagram of an example method for using customizable compiler attributes to perform code optimizations, in accordance with one or more aspects of the present disclosure.

FIGS. 6 and 7 depict flow diagrams for illustrative examples of methods 600 and 700 for using customizable compiler attributes to process source code, in accordance with aspects of present disclosure. Method 600 provides an example where the customizable compiler attributes are used to perform code checking and method 700 provides an example where the customizable compiler attributes are used to perform code optimizations. Methods 600 and 700 may be performed by processing devices that may comprise hardware (e.g., circuitry, dedicated logic, programmable logic, microcode, etc.), executable code (such as is run on a general purpose computer system or a dedicated machine), or a combination of both. Methods 600 and 700 and each of their individual functions, routines, subroutines, or operations may be performed by one or more processors of the computer device executing the method. In certain implementations, methods 600 and 700 may each be performed by a single computing device. Alternatively, methods 600 and 700 may be performed by two or more computing devices, each of the computing devices performing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 600 and 700 may be performed by components 122, 124, 126, or 128 as shown in FIGS. 2 and 5.

Referring to FIG. 6, method 600 may be performed by processing devices of a server device or a client device and may begin at block 610. At block 610, a processing device may access source code that includes a compiler attribute associated with a programming construct. The compiler attribute may be defined in the source code by an author of the source code. The author of the source code may have added text into the source code and the text may include a call to a predefined compiler function and one or more user defined values. The user defined values may be created by the author and may be the user defined attribute name.

At block 620, the processing device may execute a function of the compiler to check the programming construct at a location in the source code. The function may check the programming construct by evaluating the compiler attribute associated with the programming construct. The compiler attribute and the function of the compiler may be used at compile time to detect a logic error that would occur at runtime when executing the object code. In one example, the compiler attribute is defined by a first author of the source code and the function is a built-in compiler function that evaluates the compiler attribute at a location selected by a second author. In another example, the source code may include a first portion corresponding to an application and a second portion corresponding to a kernel. The first portion may be updated by a first author to assign the compiler attribute to a variable and the second portion may be updated by a second author to call the function of the compiler that checks the variable.

At block 630, the processing device may determine whether to generate a message indicating a status of the check. In one example, the programming construct comprises a descriptor variable and the compiler attribute indicates that a target type of the descriptor variable comprises a file, a TCP socket, a UPD socket, or a pipe. The function of the compiler may check that the target type of the descriptor variable matches an input type for a kernel function. The message that is generated may be a warning message, error message, or informational message that indicates that the check passed (e.g., descriptor and kernel function are for TCP sockets), the check failed (e.g., descriptor is UDP socket and kernel function is for TCP sockets), other message, or a combination thereof.

At block 640, the processing device may generate object code based on the source code that includes the compiler attribute. The compiler attribute and the call to the function evaluating the compiler attribute may be present in the source code and may be absent from the generated object code. In one example, an author may update an existing body of source code to add a plurality of compiler attributes and a plurality of calls to functions that evaluate the compiler attributes. The addition may have no effect on new object code generated from the updated source code and the new object code may be a duplicate of the object code that was previously generated (e.g., new object code and previous object code are bit-for-bit identical). Responsive to completing the operations described herein above with references to block 640, the method may terminate.

Referring to FIG. 7, method 700 may be performed by processing devices of a server device or a client device and may begin at block 710. At block 710, a processing device may access source code that includes a compiler attribute and the compiler attribute may be defined by text in the source code. The text in the source code that defines the compiler attribute may be provided by an author of the source code. The text may include a call to a predefined compiler function and one or more user defined attribute values created by the author. The user defined attribute values can be a user defined attribute name or a user defined attribute type.

At block 720, the processing device may detect a call in the source code to a compiler function that processes the compiler attribute and the source code may include logic to process the compiler attribute. The logic to process the compiler attribute may be provided by an author of the source code and include attribute combining logic and attribute testing logic. In one example, the processing device may generate an intermediate representation that includes multiple control flows that converge. The multiple control flows may each comprise the compiler attribute with the same or different attribute values. For example, the compiler attribute in different control flows may have been updated to include different attribute values. The processing device may use attribute combining logic provided by the author to combine the compiler attributes of the multiple control flows into a combined attribute (e.g., if inputs are the same use input value, otherwise use null value).

At block 730, the processing device may execute the compiler function at compile time and the compiler function may use the logic to process the compiler attribute and generate attribute data. In one example, executing the compiler function involves using attribute testing logic provided by the author to test the combined compiler attribute and generating the attribute data based on a result of the test.

At block 740, the processing device may use the attribute data to optimize object code generated from the source code. The source code may be updated to include a control flow statement to determine whether a specific function can be used as a substitute for a generic function. The compiler may access the compiler attribute when evaluating the control flow statement at compile time and avoid the control flow statement from being included in object code. The control flow statement may be an "if" statement, a "while" loop, or a "for" loop. In one example, the processing device may execute a compiler and the compiler may detect that the compiler attribute defined in the source code is assigned to each of a plurality of descriptor variables. The compiler may evaluate the compiler attributes at a location in the source code and the compiler attributes may indicate each of the descriptor variables comprise a target type that is a network socket. The compiler may optimize the object code to include a call to a specific function that handles network sockets and to be absent a call to a generic function that handles multiple target types. Responsive to completing the operations described herein above with references to block 740, the method may terminate.

Figure 8:
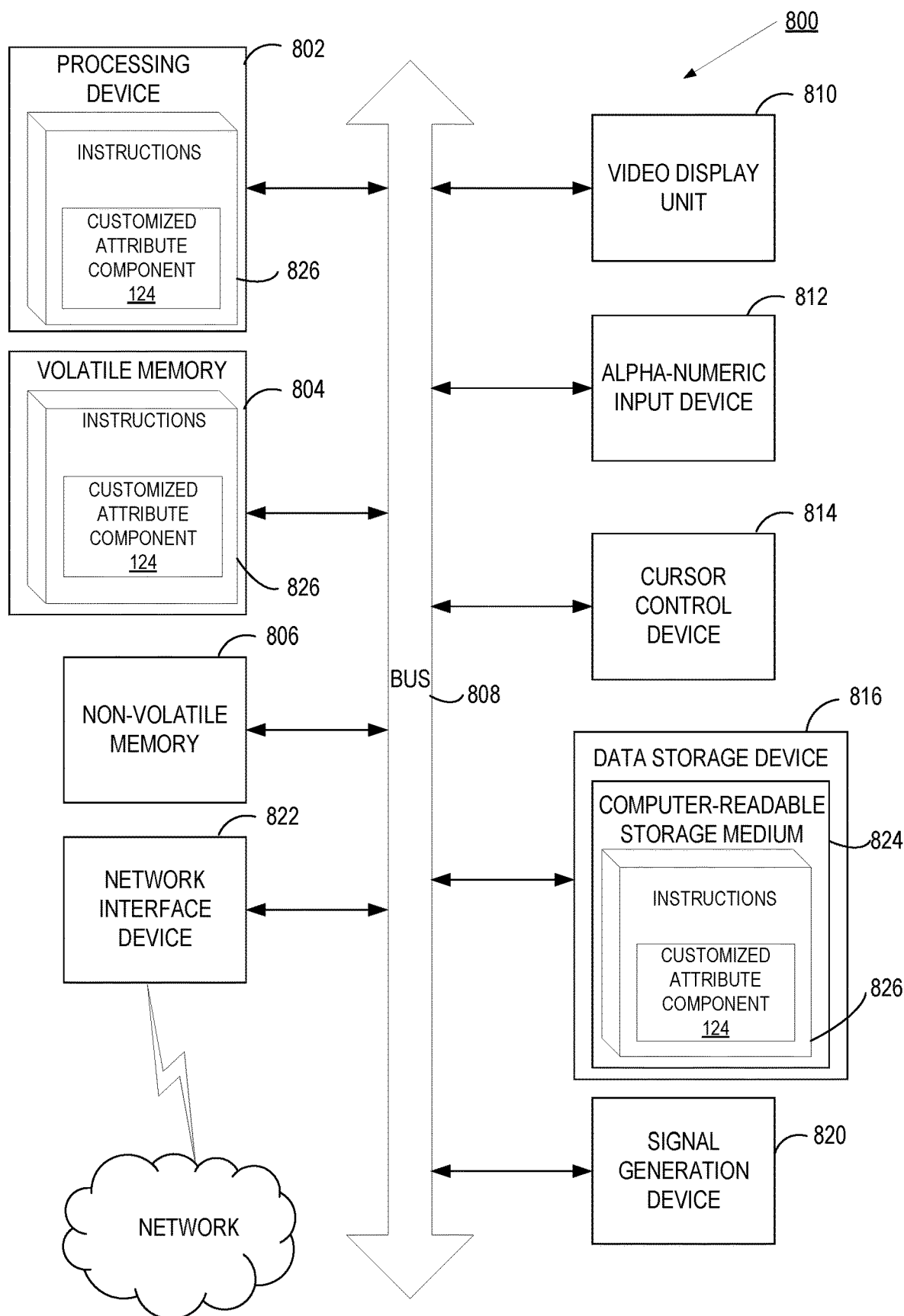
FIG. 8 depicts a block diagram of an example computer system operating in accordance with one or more aspects of the present disclosure.

FIG. 8 depicts a block diagram of a computer system operating in accordance with one or more aspects of the present disclosure. In various illustrative examples, computer system 800 may correspond to computing device 200 of FIGS. 2 and 5. Computer system 800 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alpha-numeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing methods 600 or 700 and for encoding components 122, 124, 126, and 128 of FIGS. 1, 2, and 5.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "accessing," "executing," "determining," "generating," "detecting," "using," "evaluating," "optimizing," "storing," "receiving," "updating," "comparing," "providing," "indicating," "analyzing," "transmitting," "enhancing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 600 and 700 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   accessing, by a processing device executing a compiler, a source code that comprises a customized compiler attribute;
   detecting, by the processing device, the customized compiler attribute;
   deriving, by the processing device, a definition and logic associated with the customized compiler attribute from source code;
   executing, by the processing device executing the compiler, a function of the compiler to check a targeted programming construct at a location in the source code using the derived logic associated with the customized compiler attribute;

determining, by the processing device executing the compiler, whether to generate a message indicating a status of the check; and generating, by the processing device executing the compiler, object code based on the source code.

2. The method of claim 1, wherein the customized compiler attribute is defined in view of text added by an author of the source code into the source code, wherein the text comprises a call to the predefined compiler function and one or more user defined values created by the author, wherein the user defined values comprise a user defined attribute name.

3. The method of claim 1, wherein the customized compiler attribute is defined by a first author of the source code, and wherein the function comprises a built-in compiler function that evaluates the customized compiler attribute at the location selected by a second author.

4. The method of claim 1, wherein the customized compiler attribute and the function of the compiler are used at compile time to detect a logic error that would occur at a runtime of the object code.

5. The method of claim 1, wherein the customized compiler attribute and a call to the function evaluating the customized compiler attribute are present in the source code and are absent from the object code.

6. The method of claim 1, further comprising, updating the source code to add a plurality of compiler attributes and a plurality of calls to functions that evaluate the compiler attributes, wherein the addition has no effect on new object code generated from the updated source code and the new object code is a duplicate of the object code that was previously generated.

7. The method of claim 1, wherein the source code comprises a first portion corresponding to an application and a second portion corresponding to a kernel, wherein the first portion is updated by a first author to assign the customized compiler attribute to a variable and the second portion is updated by a second author to include a call to the function of the compiler that checks the variable.

8. The method of claim 1, wherein the programming construct comprises a descriptor variable and the compiler attribute indicates that a target type of the descriptor variable comprises a file, a TCP socket, a UPD socket, or a pipe, and wherein the function of the compiler checks that the target type of the descriptor variable matches an input type for a kernel function.

9. A system comprising:
a memory; and
a processing device communicably coupled to the memory, the processing device to:
   access a source code that comprises a customized compiler attribute;
   detect, by the processing device, the customized compiler attribute;
   derive, by the processing device, a definition and logic associated with the customized compiler attribute from source code;
   execute a function of a compiler to check a targeted programming construct at a location in the source code using the derived logic associated with the customized compiler attribute;
   determining whether to generate a message indicating a status of the check; and
   generating object code based on the source code.

10. The system of claim 9, wherein the customized compiler attribute is defined in view of text added by an author of the source code into the source code, wherein the text comprises a call to the predefined compiler function and one or more user defined values created by the author, wherein the user defined values comprise a user defined attribute name.

11. The system of claim 9, wherein the customized compiler attribute is defined by a first author of the source code, and wherein the function comprises a built-in compiler function that evaluates the customized compiler attribute at the location selected by a second author.

12. The system of claim 9, wherein the customized compiler attribute and the function of the compiler are used at compile time to detect a logic error that would occur at a runtime of the object code.

13. The system of claim 9, wherein the customized compiler attribute and a call to the function evaluating the customized compiler attribute are present in the source code and are absent from the object code.

14. The system of claim 9, wherein the processing device is further to update the source code to add a plurality of compiler attributes and a plurality of calls to functions that evaluate the compiler attributes, wherein the addition has no effect on new object code generated from the updated source code and the new object code is a duplicate of the object code that was previously generated.

15. The system of claim 9, wherein the source code comprises a first portion corresponding to an application and a second portion corresponding to a kernel, wherein the first portion is updated by a first author to assign the customized compiler attribute to a variable and the second portion is updated by a second author to include a call to the function of the compiler that checks the variable.

16. The system of claim 9, wherein the programming construct comprises a descriptor variable and the customized compiler attribute indicates that a target type of the descriptor variable comprises a file, a TCP socket, a UPD socket, or a pipe, and wherein the function of the compiler checks that the target type of the descriptor variable matches an input type for a kernel function.

17. A non-transitory machine-readable storage medium storing instructions which, when executed, cause a processing device to perform operations comprising:
   accessing a source code that comprises a customized compiler attribute;
   detecting, by the processing device, the customized compiler attribute;
   deriving, by the processing device, a definition and logic associated with the customized compiler attribute from source code;
   executing a function of a compiler to check a targeted programming construct at a location in the source code using the derived logic associated with the customized compiler attribute;
   determining whether to generate a message indicating a status of the check; and
   generating object code based on the source code.

18. The non-transitory machine-readable storage medium of claim 17, wherein the customized compiler attribute is defined in view of text added by an author of the source code into the source code, wherein the text comprises a call to the predefined compiler function and one or more user defined values created by the author, wherein the user defined values comprise a user defined attribute name.

19. The non-transitory machine-readable storage medium of claim 17, wherein the customized compiler attribute is defined by a first author of the source code, and wherein the function comprises a built-in compiler function that evaluates the customized compiler attribute at the location selected by a second author.

20. The non-transitory machine-readable storage medium of claim 17, wherein the customized compiler attribute and the function of the compiler are used at compile time to detect a logic error that would occur at a runtime of the object code.

\* \* \* \* \*